United States Patent
Nave et al.

(10) Patent No.: US 8,717,254 B1
(45) Date of Patent: May 6, 2014

(54) PORTABLE MOTION SENSOR AND VIDEO GLASSES SYSTEM FOR DISPLAYING A REAL TIME VIDEO DISPLAY TO A USER WHILE EXERCISING

(76) Inventors: Thomas J. Nave, Petaluma, CA (US); Dennis Atwood, Fairfax, CA (US)

( * ) Notice: Subject to any disclaimer, the term of this patent is extended or adjusted under 35 U.S.C. 154(b) by 841 days.

(21) Appl. No.: 12/803,885

(22) Filed: Jul. 7, 2010

Related U.S. Application Data (60) Provisional application No. 61/270,430, filed on Jul. 7, 2009.

(51) Int. Cl.
*G09G 5/00* (2006.01)

(52) U.S. Cl.
USPC .................................. 345/8; 345/7

(58) Field of Classification Search
USPC ................... 345/7–9, 156–168, 204–215
See application file for complete search history.

(56) References Cited

U.S. PATENT DOCUMENTS

| | | | | |
|---|---|---|---|---|
| 6,004,243 A * | 12/1999 | Ewert | | 482/8 |
| 2006/0009702 A1* | 1/2006 | Iwaki et al. | | 600/520 |
| 2010/0022354 A1* | 1/2010 | Fisher | | 482/8 |

* cited by examiner

*Primary Examiner* — Vijay Shankar
(74) *Attorney, Agent, or Firm* — Jay P. Hendrickson (57) ABSTRACT

A portable system is disclosed for displaying a real time video to a user wearing video glasses and while engaging in exercise. The system comprises a motion sensor for attachment to the of the user, with sensor generating a plurality of consecutive signals based upon the motion of the user's body. The video glasses of the system also comprise a video frame sequence stored in a memory; a programmed video processor for modifying the video frame sequence as a function of the difference in magnitude between the consecutive signals generated by the motion sensor; and a video display for displaying the modified video frame sequence with the display of the modified video frame sequence changing as a function of the body motion of the user.

10 Claims, 11 Drawing Sheets

PORTABLE MOTION SENSOR AND VIDEO GLASSES SYSTEM FOR DISPLAYING A REAL TIME VIDEO DISPLAY TO A USER WHILE EXERCISING

RELATED APPLICATION

This application relates to and claims the benefit under 35 U.S.C. §119(e) of U.S. Provisional Application No. 61/270,430 filed on Jul. 7, 2009.

TECHNICAL FIELD

This provisional application relates to motion sensors and video display devices used in conjunction with physical exercise equipment.

BACKGROUND

It is well known that moderate cardiovascular exercise performed on a regular basis strengthens the heart and more generally helps to maintain a healthy cardiovascular system. It is also generally recognized that possibly the most beneficial cardiovascular exercise is obtained when exercising outdoors where the exerciser breathes fresh air and encounters a wide array of visual input and surface conditions that combine to make the exercising experience more enjoyable. Unfortuanately, it is not always possible to exercise outdoors, which has lead to development and introduction of many different types of stationary exercise equipment, such as stationary bicycles, stair steppers, elliptical machines and treadmills.

Recently, additional features have been added to stationary exercise equipment in an attempt to make the exercise experience more enjoyable and in some instances attempt to create an experience that more closely resembles the experience of exercising outdoors. A typical example of some of these additional features is illustrated in U.S. Pat. No. 6,004,243 ('243 patent). The '243 patent discloses a stationary exercise bicycle that has a motion sensor attached to the bicycle frame with the sensor connected via a cable to a controller mounted on the handlebars. The controller is in turn connected via another cable to a video player that is connected via another cable to TV set or a video monitor. A video CD contains real time video and audio frames recorded on the CD with the video containing, for example, a film of a bicycle ride through the countryside from the vantage point of the rider. In operation, the user loads the CD into the video player, gets on the bicycle, and as he or she starts to pedal the video player starts playing the CD that is displayed on the TV in front of the rider. Another feature of the patented invention is that the motion sensor, preferably a reed switch, on the bicycle frame senses a change in the rotational speed of the bicycle tire by sensing the rotational speed of a magnet attached to a wheel spoke. This change in rotational speed is used as input by a program in the controller to modify the video sequence rate of the video player commensurately with the rotational pedal speed of the user. The patent claims that this feature gives the user/viewer a realistic feeling that he or she is actually following the route displayed of a bicycle traveling through the scene in real time. The patent also discloses that the time between frames is adjusted based not only on the speed of the user but also in order to ostensibly ensure that there is a smooth transition between frames. This adjustment is empirically established based upon the operational characteristics of the video player and its operating system, with the time adjustment varying for predetermined incremental increases in the speed of the bicycle.

As described above, the '243 patent incorporates some additional features into an exercise machine in order to present the user with a visual experience on a TV that ostensibly approximates the actual scene the user would encounter if he or she were following the route displayed on the TV. However, there are several significant limitations to the apparatus and method disclosed in the patent. The patent describes the utilization of a reed switch that is attached to the bicycle frame and is in communication with a magnet attached to a wheel spoke. As the user pedals the bicycle, the reed switch and its associated magnet generate a periodic, on and off, pulse of electricity of varying time periods depending on the cycling speed of the user. The varying time periods are then utilized by the video player to modify the playback duration of the CD video frames. However, the patent also points out that in order to ensure that the video player displays a smooth transition between frames that the duration of each frame must be adjusted by an empirically determined time interval that is dependent upon the operating characteristics of the video player.

The present invention overcomes these limitations of the '243 patent by providing a portable motion sensor that is worn on the leg of the user and is in remote communication with video glasses that wrap around the eyes of the user. Further, the necessity of empirically adjusting the playback speed of the video player is eliminated by incorporating a predetermined number of additional video frames to the original video during a post-production process that creates a smooth transition between frames regardless of the type of video player that is used. As a result, the sensor and video glasses of the present invention can be worn by a user on any type of exercise equipment or even without any exercise equipment at all by wearing the sensor and glasses while merely running or walking in place, and the video glasses present a stereoscopic video display to the user of a scene that appears to be realistically moving in response to the foot speed of the user. A more complete description of the invention is set forth the following sections.

SUMMARY

A portable system is disclosed for displaying a real time video to a user wearing video glasses and while engaging in exercise, comprising: a) a motion sensor for attachment to the body of the user, said sensor comprising: a gyroscope for generating a plurality of consecutive signals based upon the motion of the user's body; a controller for receiving and processing the consecutive signals; and a first device for receiving the consecutive signals from the controller; and b) the video glasses comprising: a video frame sequence stored in a memory within the video glasses; a second device for receiving the consecutive signals from the first device; a programmed video processor for receiving the consecutive signals from the second device and modifying the video frame sequence as a function of the difference in magnitude between the consecutive signals; and a video display for displaying the modified video frame sequence with the display of the modified video frame sequence changing as a function of the body motion of the user.

Also disclosed is a method for displaying a real time video to a user wearing video glasses and while engaging in exercise, comprising the following steps: producing a video frame sequence; storing the video frame sequence in a memory within the video glasses; attaching a motion sensor to the body of the user; using the motion sensor to generate a plurality of consecutive signals in response to the motion of the user's body; sending the signals to a programmed video processor within the video glasses: using the video processor to modify the video frame sequence as a function of the difference in magnitude between consecutive signals; and displaying the modified video frame sequence with the display of the video frame sequence changing as a function of the body motion of the user.

DETAILED DESCRIPTION OF PREFERRED EMBODIMENTS

Figure 1A:
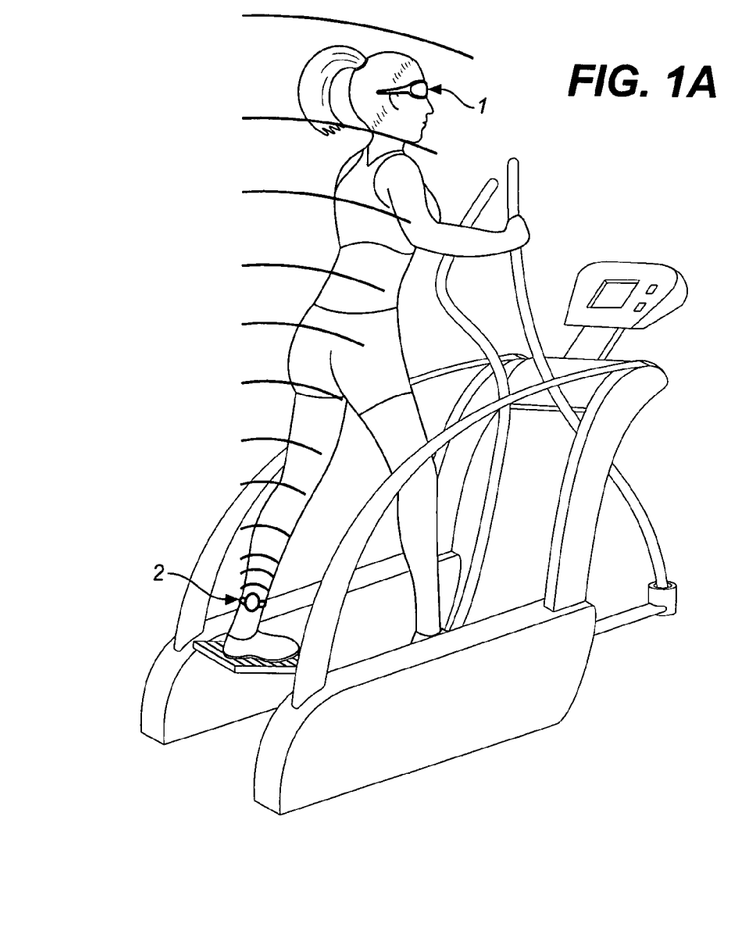
FIG. 1A is an illustration of a user wearing a motion sensor and video glasses while exercising on an elliptical machine.
Figure 1B:
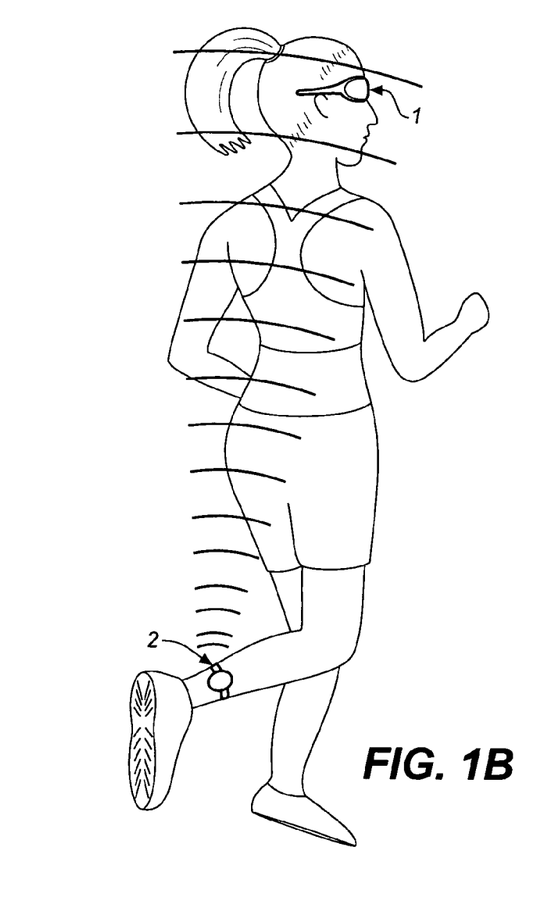
FIG. 1B is an illustration of a user wearing the motion sensor and video glasses while exercising by running in place.

FIG. 1A illustrates an embodiment of a portable motion sensor and video glasses system for displaying a real time video display to a user while exercising. As shown in the figure, the user is standing on an elliptical exercise machine and is wearing a pair of video glasses 1, with a motion sensor 2 attached to the ankle portion of the user's leg. In general, as the user exercises on the elliptical machine, the motion of the user's ankle is sensed by motion sensor 2 which, in response, produces a plurality of consecutive voltage values that are sent to the video glasses 1 by means of a wireless signal 3. The consecutive voltage values are then used by the video glasses 1 to display a video frame sequence to the user. Although the figure illustrates the user exercising on an elliptical machine, the portable system can be used with any type of exercise machine, because the motion sensor senses the motion of a portion of the user's body, rather than the motion of the exercise machine. Accordingly, the portable system can also be used with, for example, a stair stepper, treadmill, stationary bicycle, and Heath Rider®. In fact, as shown in FIG. 1B, the portable system can even be used without exercising on a machine, as when the user is simply running in place.

Figure 2:
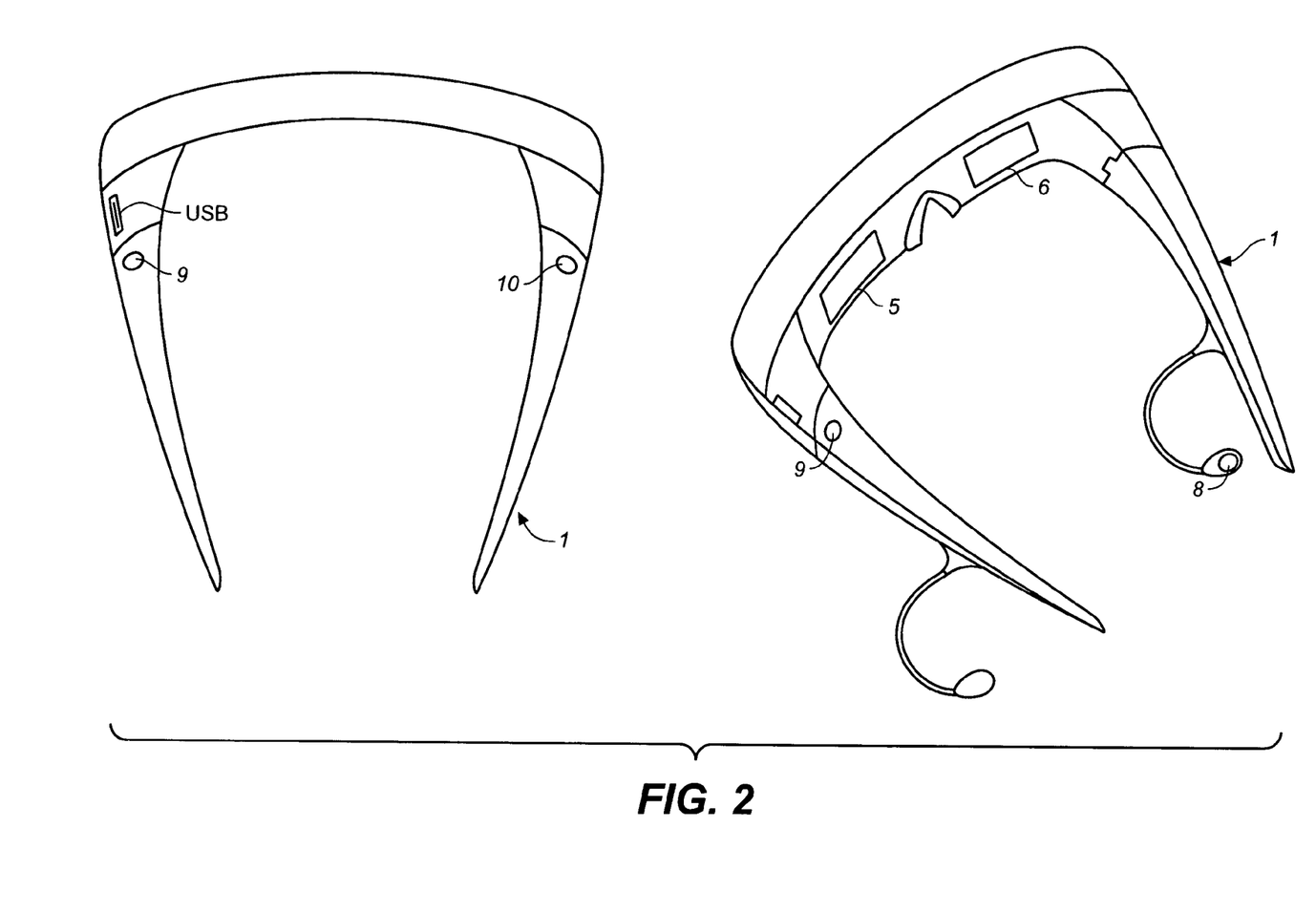
FIG. 2 is an illustration of the video glasses worn by the user while exercising.

FIG. 2 presents a more detailed illustration of the video glasses 1 that display a video frame sequence to the user while exercising. The video glasses 1 can have a design similar to the most popular video glasses on the market today, such as glasses manufactured by Myvu Corporation. The video glasses 1 include left and right LCD viewing screens, 5 and 6, coupled to an LCD driver, and have left and right earphones, 7 and 8, for connection to the users ears. Control of the video glasses 1 can be provided by a pair of left and right hand control buttons located on the left and right side temple-frame extensions, respectfully. While wearing the video glasses 1, the user can simultaneously press left and right control buttons 9 and 10 to turn the video glasses 1 on and off. When the glasses are turned on a menu appears on the LCD screens. Then, by successively pressing the left button 9, the user can scroll through the following menu options:

1. video:
   a) select a video recording
   b) increase brightness
   c) decrease brightness
   d) increase contrast
   e) decrease contrast
2. Audio:
   a) select an audio recording
   b) increase volume
   c) decrease volume
3. Start
4. Pause
5. Stop Menu selections are then made by pressing the right button 10. Once the video and audio selections are made, the user can start video and audio playback by using the left button 9 to select start and then pressing the right button 10, which closes the dropdown menu and opens the video and audio media files in a play or pause mode. Then, as will be described in more detail below, as soon as the user starts to exercise while wearing the motion sensor 1, the video and audio recordings that were selected will start to play by displaying the video on LCD screens 5 and 6 and sending the audio sound to earpieces 7 and 8.

Figure 3A:
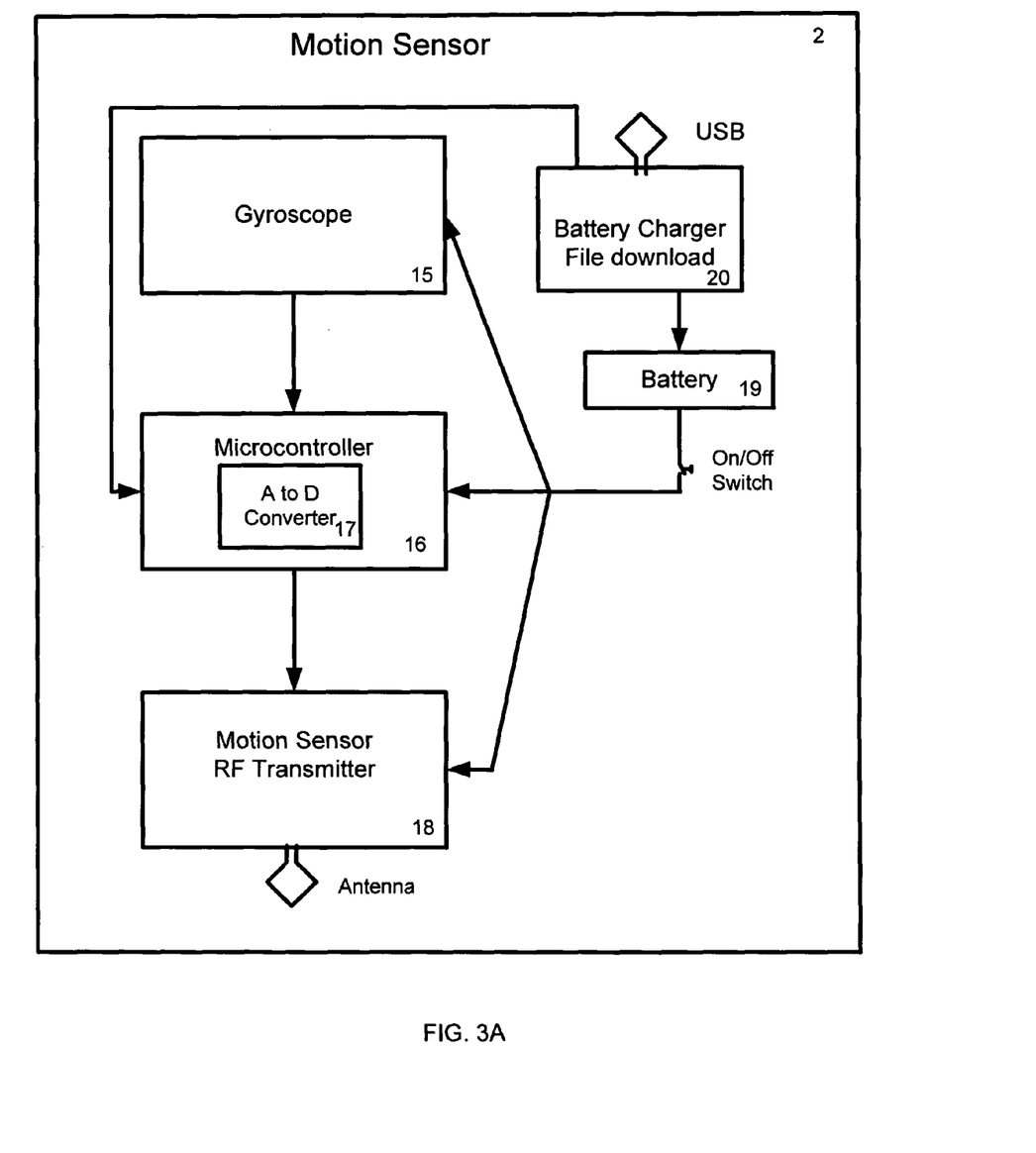
FIG. 3A is a block diagram of the operational components of the motion sensor.

Turning to FIG. 3A, the components of the motion sensor 2 will now be described. The motion sensor 2, which can be attached the user's ankle, comprises an angular rate sensing gyroscope 15 that is used to sense the user's exercise motion as an acceleration or deceleration of the user's ankle and outputs a plurality of consecutive voltage values based upon the motion detected. Although it is preferred to attach motion sensor 2 to the user's ankle, the sensor can also be attached to other parts of the user's leg or body so long as the motion of the body part creates some angular motion. The consecutive voltage values are then continuously sent to a microcontroller 16 where the voltages are converted from analog voltage values to digital voltage values by an analog-to-digital converter 17. Once the consecutive voltage values have converted to digital voltage values, the voltage values are sent by the microcontroller 16 to a motion sensor Radio Frequency (RF) transmitter 18 for wireless transmission of the voltage value signals from an antenna to the video glasses 1. Motion sensor 2 also includes a battery source 19 that supplies power to the microcontroller 16, gyroscope 15 and motion sensor RF transmitter 18. A USB battery charger port 20 is provided to allow the battery to be charged from computer connection and to enable the programmed microcontroller 16 to be modified or upgraded, and an on/off switch is provided to enable the user to activate or deactivate sensor 2.

Figure 3B:
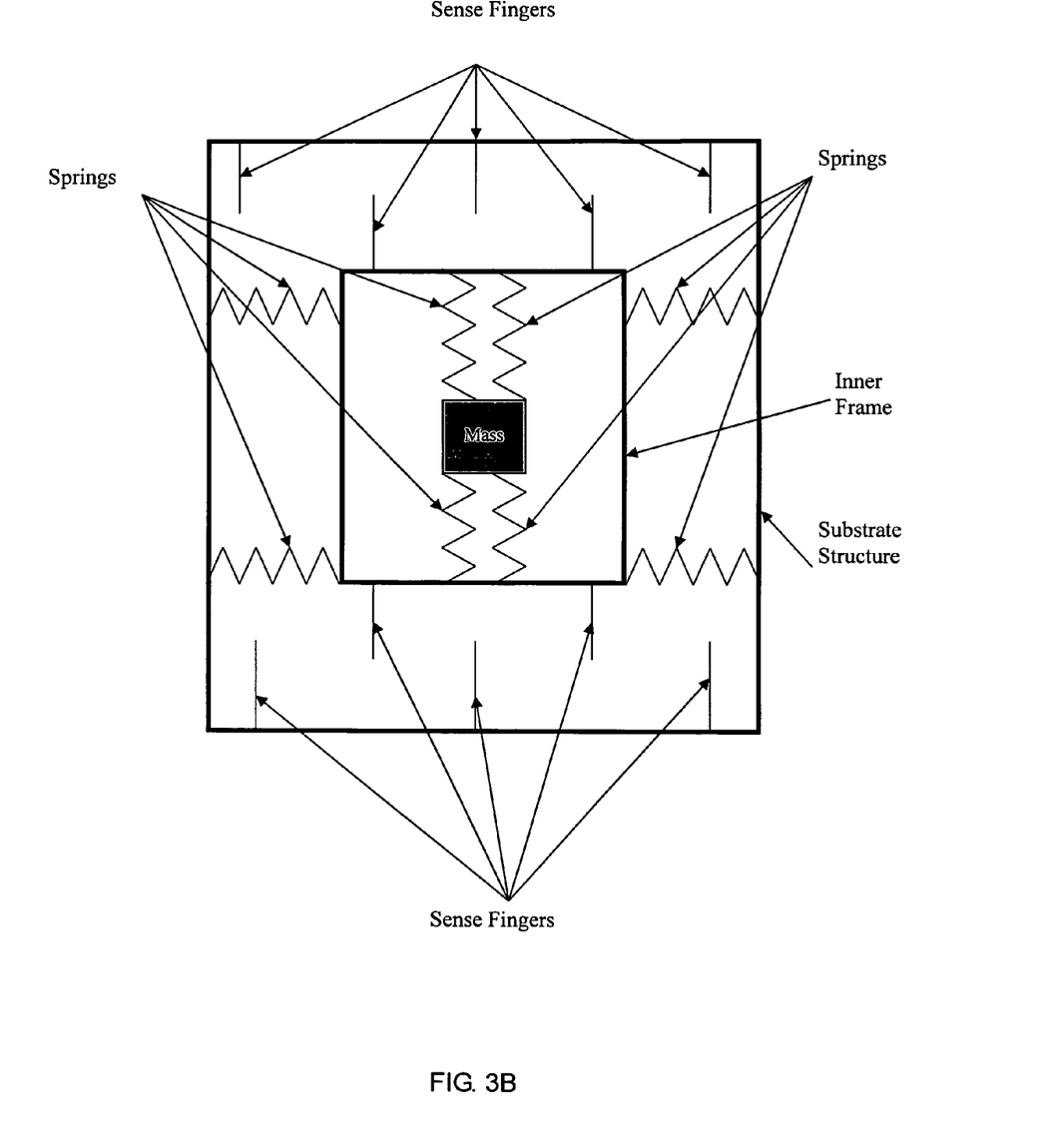
FIG. 3B is a schematic diagram of a gyroscope.

A more detailed illustration of the angular rate sensing gyroscope 15 is schematically depicted in FIG. 3B, which shows a typical electrical layout of the components that comprise the gyroscope 15 within sensor 2. The gyroscope can include a moveable resonating mass that is spring-loaded in a vertical orientation between the top and bottom surfaces of the inner sides of an inner cubical frame. The inner cubical frame is, in turn, spring loaded in a horizontal orientation between two opposed inner side surfaces of a substrate structure, encasing the inner frame. Sense fingers are positioned on the inner frame and on the outer substrate structure and are used to sense a change in capacitance levels measured between the fingers. When a voltage is applied to the resonating mass, it will begin to oscillate. When the structure is subjected to constant angular velocity, there will be no change of the capacitance between the fingers on the frame and those attached to the substrate. However, when the structure undergoes an angular acceleration or deceleration, a reactive or inertial force on the gyroscope's mass will be generated, which will in turn compress the springs. However, due the Coriolis Effect on the oscillating mass, the differential displacement of the mass will produce a slightly different response in the capacitance between the fingers, which enables the gyroscope to be used to sense whether the mass is rotating in a clockwise or counter clockwise direction. This change in capacitance is converted by the gyroscope to a variable voltage, which can then be used to determine if the gyroscope is experiencing an acceleration or deceleration and whether it is rotating clockwise or counterclockwise. More specifically, when the gyroscope is not rotating, it produces a nominal voltage that is equal to one-half the power supply voltage. When the gyroscope is subjected to an angular velocity while rotating in a clockwise direction, however, the voltage will increase or decrease in proportion to an increase or decrease in its velocity, respectively. However, the voltage will not fall below the level of one-half or above the power supply. On the other hand, when the gyroscope is experiencing a counterclockwise angular acceleration, the voltage will vary between one-half the power supply and zero volts. A gyroscope that would be appropriate for use as angular rate sensing gyroscope 15 is a LY5150ALH 28 pin Yaw Rate Gyroscope, manufactured by STMicroelectronics, Inc, and having a sensitivity of 0.167 mW/sec and a full scale voltage of 3.6 volts; however, as will be apparent to those skilled in the art, other gyroscope models with different sensitivities and voltage scales could also be used.

Figure 3C:
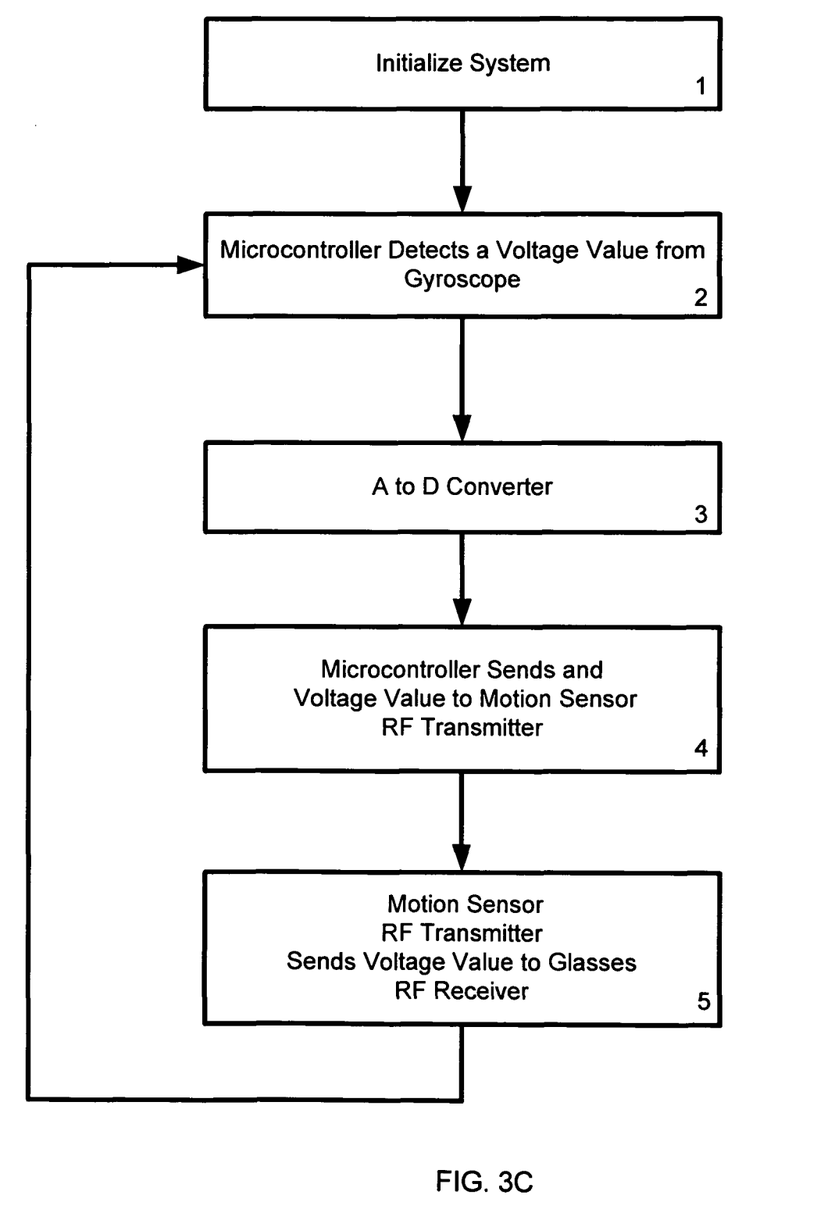
FIG. 3C is a flow chart of the operation of the motion sensor.

Next, the operation of microcontroller 16 within motion sensor 2 is illustrated in more detail in the flowchart of FIG. 3C. Initially at step 1 the microcontroller 16 and the other components within motion sensor 2 are powered up when the user activates the motion sensor by using the on/off switch, and at step 2 the microcontroller is then ready to detect a voltage value signal (other than the nominal voltage value of one-half the power supply) from the gyroscope 15 as soon as the user starts exercising. When a voltage value signal is detected it is converted from an analog voltage value to a digital voltage value by analog-to-digital converter 17 at step 3 and as described above in connection with FIG. 3A. Control passes to step 4 where the programmed microcontroller 16 sends the voltage value to the motion sensor RF transmitter 18, which in turn at step 5 sends the voltage value to the video glasses RF receiver 30 (See FIG. 5A). Simultaneously, control returns to step 2 where the microcontroller waits to detect another voltage value and process a detected voltage value as described above. The cycle continues until the user has stopped exercising and/or turned off motion sensor 2.

It is one of the features of the present portable system that the user is able to watch a real time video recording while exercising. As used herein, "real time" means that the user is presented with a video display on the LCD viewing screens 5 and 6 that appears to be moving in response to the speed of the user while moving through the outdoor scene depicted in the video. As the user increases or decreases his or her exercise speed, the video being displayed appears to be passing by the user just as it would if the user were traveling through, for example, a forest of redwoods in a National Park. In this regard, one of the challenges presented in an attempt to create a real time video is to ensure that as the video is sped up or slowed down in response to the users exercise speed that the transitions are displayed without any jerky or stutter movements that would spoil the real time experience. As discussed in the Background Section herein, prior attempts that have addressed this problem used a trial and error process to determine for each incremental increase or decrease in exercise speed a corresponding increase or decrease in the length of time a video frame is displayed. This ostensible solution to the problem, however, contains an inherent limitation in that the determination of the length of time a video frame is displayed is based upon and is dependent upon the operational characteristics of the video player. As a result, the frame display time must be experimentally determined for each video player that is intended to be used. The present inventors have eliminated this dependency on the video player by developing a system that uses a unique post-production video frame sequence that is operable with all video players.

Figure 4:
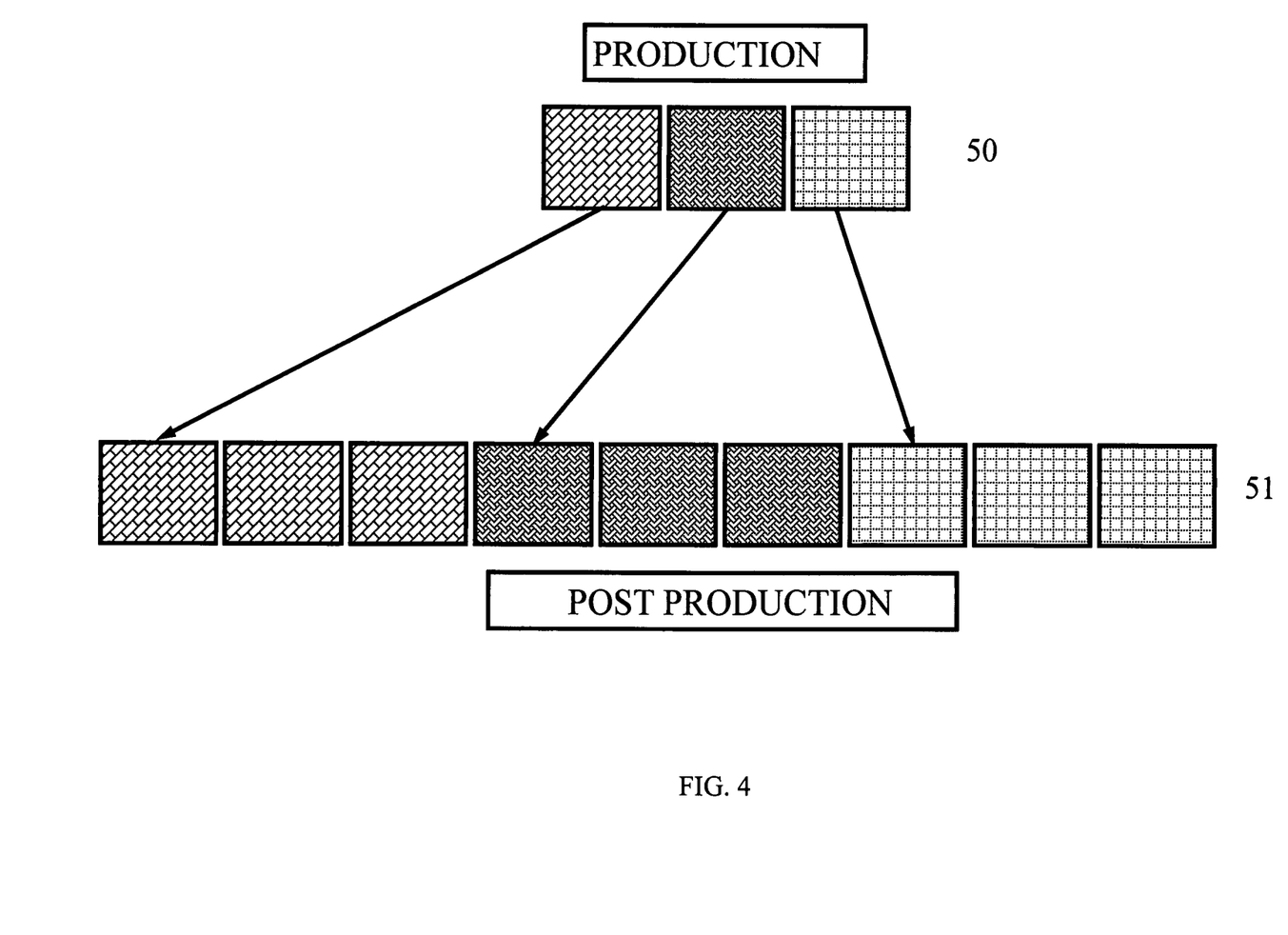
FIG. 4 is an illustration of a post-production video frame sequence produced by adding a predetermined number of post-production frames following each production video frame within a production video frame sequence.

The production of a post-production video frame sequence is schematically depicted on FIG. 4. The figure illustrates a sample of a production video frame sequence 50 containing three production frames that are produced by the operation of a digital video camera. Also shown is a post-production video frame sequence 51 that contains the same three production frames, and contains two additional post-production frames that have been added following each production frame and that are identical to their corresponding production frame. Although the figure only illustrates two additional post-production frames following each production frame, it is anticipated that several more additional post-production frames can be added to each production frame in order to produce a smooth video display at the slowest playback speeds. However, once the optimal number of additional frames has been determined, the resulting video can be used with all video playback equipment without any further modification; thus eliminating the need to experimentally determine each video frame display time based upon the video player being used.

Figure 5A:
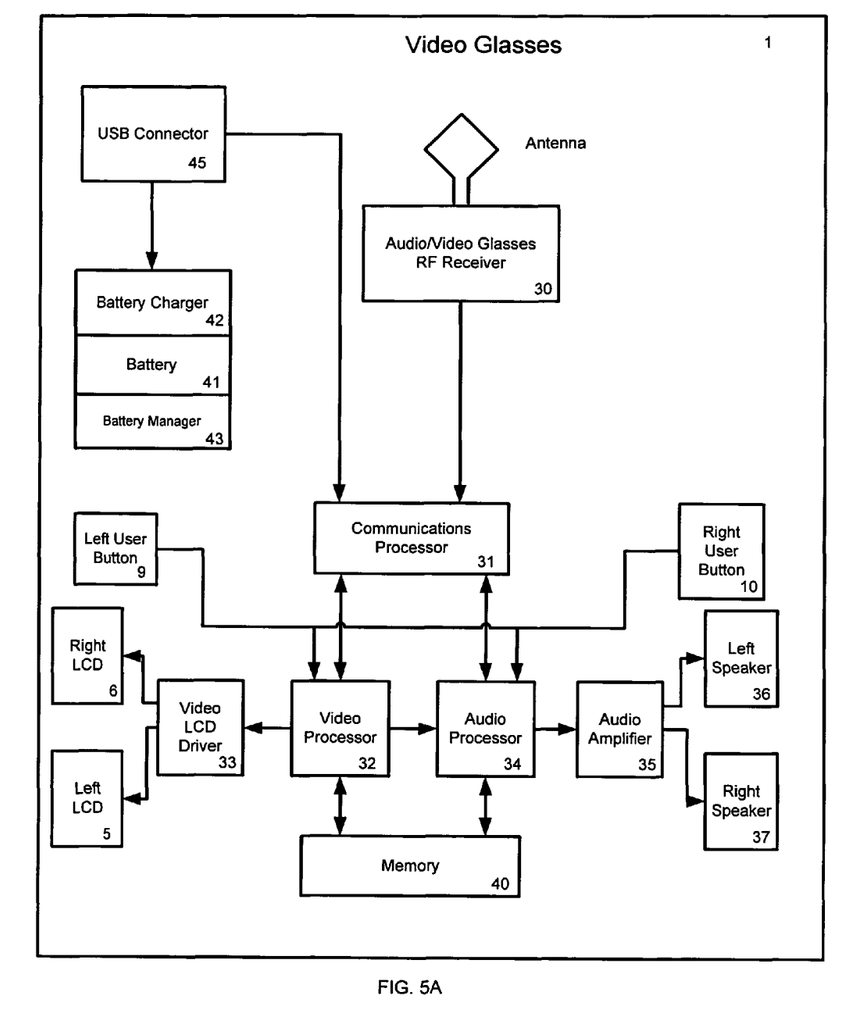
FIG. 5A is a block diagram of the operational components of the video glasses.

The flow chart in FIG. 5A generally illustrates the operational components of the video glasses 1. As described above in connection with FIGS. 3A and 3C, the plurality of consecutive voltage values generated and processed by the motion sensor 2 are sent by a wireless communication from the motion sensor RF transmitter 18 to the video glasses 1, where the signal is received by the video glasses RF receiver 30. The RF receiver 30 sends the consecutive voltage values to a communications processor 31 that is used to control the RF receiver 30 in order to establish and maintain a communications link with the motion sensor 2. The communications processor 31 receives data from all external sources, whether from the motion sensor 2 or the USB port 45, and processes the data and sends it to the required location. Then the communications processor 31 sends the voltage values to a programmed video processor 32 which in general determines whether there is a change in voltage between consecutive voltage values. If video processor 32 detects a change in voltage, it then determines how many of the post-production frames following each production frame within the post-production video frame sequence 51 need to be displayed. This process will be described in more detail in connection with FIGS. 5B and 5C. Once the video processor determines how many of the post-production frames need to be displayed, the post-production video frame sequence 51, including only those post-production frames that need to be displayed, is displayed on left and right LCD screens 5 and 6 by video LCD driver 33.

Video glasses 1 also contain a memory 40 in communication with video processor 32. The memory 40 is used for storing both post-production video frame sequence 51 files and audio files that can be played along with the video. The video and audio files can be downloaded to memory 40 from USB connector 45 that is in communication with a source of the files. Audio processor 34 is used to process the audio files stored in memory 40 and to send the audio files to audio amplifier 35, which in turns sends the files to left and right speakers, 36 and 37. As noted above in connection with FIG. 2, left and right user buttons, 9 and 10, are operable by the user to select desired video and audio files that will both start to play as soon as the user starts to exercise. The video glasses also contain a battery 41, battery charger 42 that are in communication with USB connector 45 that allows the battery charger 42 to obtain power from a remote source. A battery manager 43 is used to supply the battery power to the communications processor 31 and to video and audio processors, 32 and 34, respectfully.

Figure 5B:
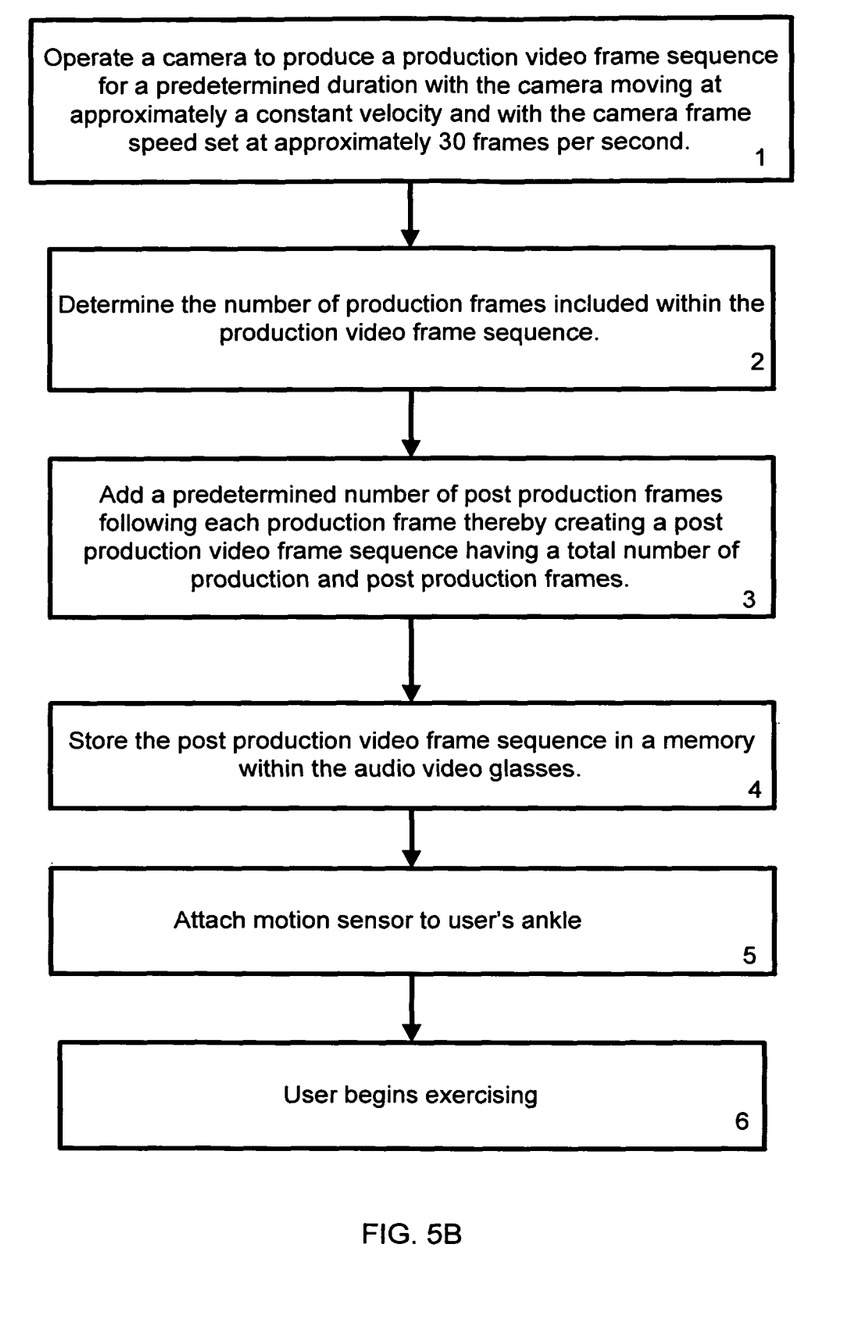
FIGS. 5B, 5C and 5D are flow charts of the operational components of the video glasses.

Referring now to the flow charts of FIGS. 5B and 5C a more detailed description of the process of creating the production and post-production video frame sequences 50 and 51 and the operation of programmed video processor 32 will be described. As illustrated in step 1 of FIG. 5B, the production video frame sequence 50 is created by operating a digital camera for a predetermined time period, with the camera mounted, for example, on a vehicle that is traveling through an outdoor scene at an approximately constant velocity and with the camera frame speed set at a predetermined frame speed, for example 30 frames per second. Once the production video frame sequence 50 has been produced, the number of production frames within the production video frame sequence is determined at step 2. Then in a post-production process at step 3, a predetermined number of post-production frames are added following each production frame, with each of the post-production frames being identical to its associated production frame. In this manner the post-production video frame sequence 51 having a total number of production and post production frames is created. Then at step 4, the post-production video frame sequence 51 is stored in the memory 40 within the video glasses 1 as described in connection with FIG. 5A. Step 5 includes the process of a user simply attaching the motion sensor 2 to his or her ankle. In step 6 the user begins exercising while wearing the video glasses 1 and the motion sensor 2, both of which have been activated by the user.

Figure 5C:
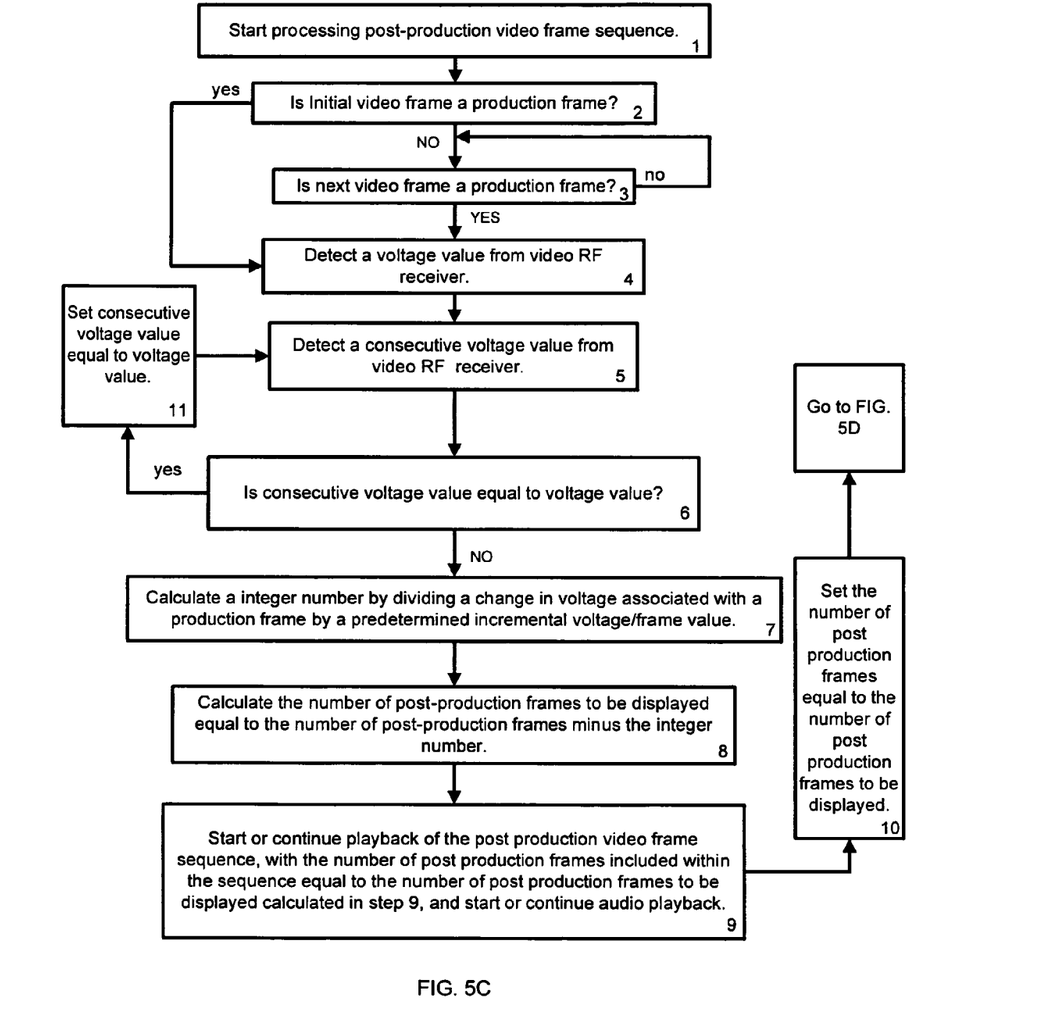

FIG. 5C illustrates the processes performed by programmed video processor 32 within video glasses 1. Referring to step 1 of FIG. 5C, as soon as the user presses the start button on video glasses 1, video processor 32 starts processing the post-production video frame sequence 51 to determine how many, if any, of the post-production frames must be displayed based upon the speed of the user's ankle motion. At step 2, video processor 32 determines if the initial frame being processed is a production frame. If so, control passes to step 4. If the initial frame is not a production frame, control passes to step 3 where a loop is initiated to determine whether the next frame in sequence is a production frame, rather than a post-production frame. The loop continues until a production frame is found and control passes to step 4. At step 4, video processor 32 is used to detect a voltage value from the video RF receiver 30, and then at step 5, video processor 32 is used to detect a consecutive voltage value following the voltage value detected at step 4. Then at step 6, video processor 32 determines if there is a difference between the voltage value detected at step 4 and the consecutive voltage value detected at step 5. If there is no difference between the voltage values, meaning that the user is exercising but the angular velocity of the user's leg is not changing, control passes to step 11 where the consecutive voltage value is set to equal the voltage value, and the steps 4, 5 and 6 are repeated until video processor 32 detects a difference between the voltage value and the consecutive voltage value at step 6, which indicates that the user's leg motion is generating a change in angular velocity.

When video processor 32 detects a change in angular velocity, an algorithm is performed to determine how many of the post-production frames should be displayed in order to ensure that playback of the post-production video frame sequence 51 is smooth. This algorithm starts at step 7 where video processor 32 calculates an integer number which is the result of dividing a voltage change associated with a production frame by a predetermined incremental voltage. This incremental voltage is, in general, based upon the operating characteristics of the gyroscope 15. For example, assuming that one-half the power supply voltage of the gyroscope is 1.75 volts and the maximum gyroscope voltage is 3.5 volts, then the gyroscope 15 would have a voltage range of 1.75 volts. Assume further that during post-production, the post-production video frame sequence 51 is created by adding 100 post-production frames after each production frame. Based on these assumptions, the incremental voltage is determined by dividing the voltage range of 1.75 volts by 100 post-production frames, giving 0.0175 volts/frame. Then assuming that the voltage change between the consecutive voltage value detected at step 5 and the voltage value detected at step 4 is equal to 0.5 volts (meaning that the user's angular velocity is changing), the integer number is calculated by dividing 0.5 volts by 0.0175 volts/frame, giving 28.57 frames or an integer number of 28 frames. The algorithm continues at step 8, where the number of post-production frames to be displayed is calculated to equal the total number of post-production frames minus the integer number. Continuing the previous example, since the number of post-production frame is equal to 100, the number of post-production frames to be displayed is 72 (100-28).

Figure 5D:
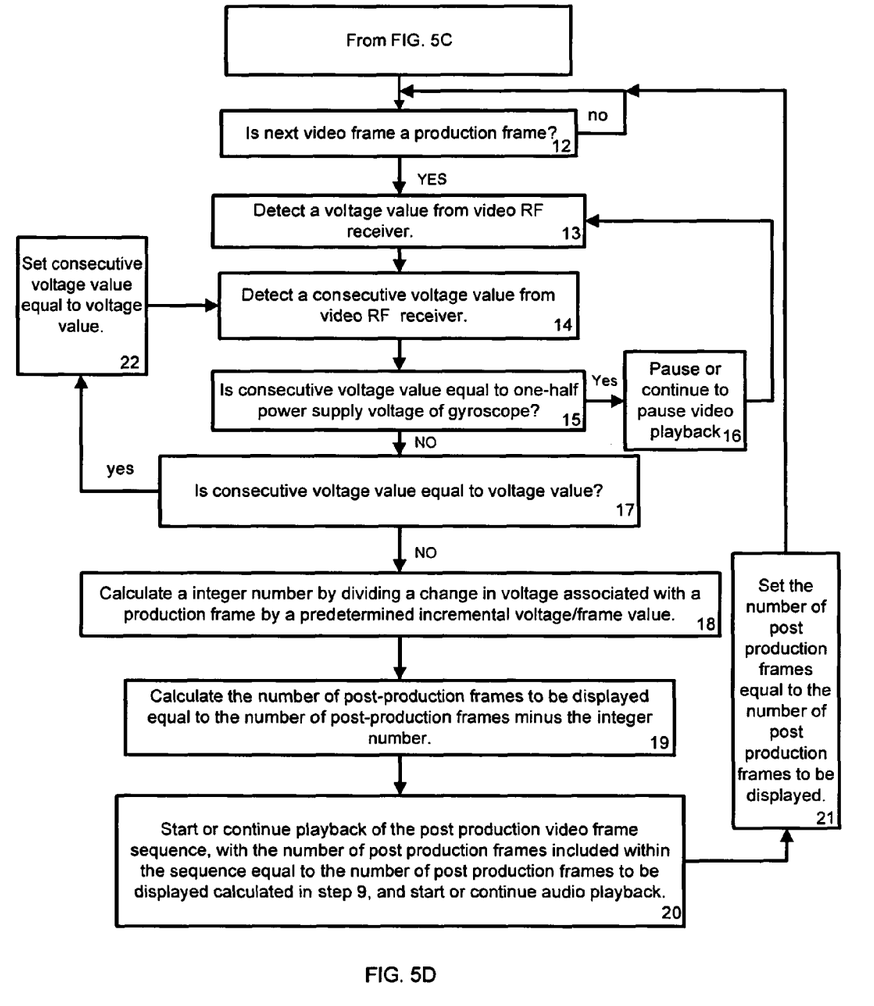

Control then passes to step 9 where video processor 32 either starts or continues video playback of the post-production video frame sequence, with the number of post-production frames included with the playback equal the number of post-production frames to be displayed as determined in step 8. Simultaneously, audio processor 34 starts or continues to audio playback of the audio files that have been stored in memory 40. Then in step 10, video processor 32 sets the number of post-production frames equal to the number of post-production frames to be displayed. Next, control passes to the process illustrated in FIG. 5D which is a continuation of the process of FIG. 5C. At step 12 in FIG. 5D, video processor 32 again determines whether the next video frame is a production frame. If a production frame is not detected, step 12 is repeated until a production frame is detected or the processor determines that all production frames have been processed and video playback is stopped. Assuming that another production frame is detected, control passes to steps 13 and 14 where a voltage value and a consecutive voltage value, respectively, are detected. Control then passes to step 15 where the video processor determines whether the consecutive voltage value is equal to one-half the power supply voltage of the gyroscope. If the condition met, meaning that the user has stop exercising, control passes to step 16 where the video processor pauses or continues to pause video playback of the post-production video frame sequence, and the processor returns control to steps 13 and 14 where another voltage value and consecutive voltage value are detected. If the processor determines at step 15 that the consecutive voltage value is not equal to one-half the power supply of the gyroscope, control passes to step 17 where the processor determines whether the consecutive voltage is equal to the voltage value. If the voltage values are equal, at step 22 the consecutive voltage value is set to equal the voltage value and control returns to step 14. The remaining steps 18 through 21 are identical to steps 7 through 10, respectively, as described in connection with FIG. 5C, with the exception that at step 21 control passes to step 12, rather than to the process of FIG. 5D. At step 12, video processor 32 again searches for the next production video frame. The described process continues until the entire post-production video frame sequence has been displayed to the user on left and right LCD viewing screens 5 and 6, or until the user stops exercising and presses the stop button on the video glasses. FIG. 5C and FIG. 5D describe a specific algorithm for determining how many post-production frames should be displayed in order to create a playback of the post-production video frame sequence 51 that is smooth. However, it will be recognized by those skilled in the art that other comparable algorithms could be utilized to produce the same effect.

Figure 6:
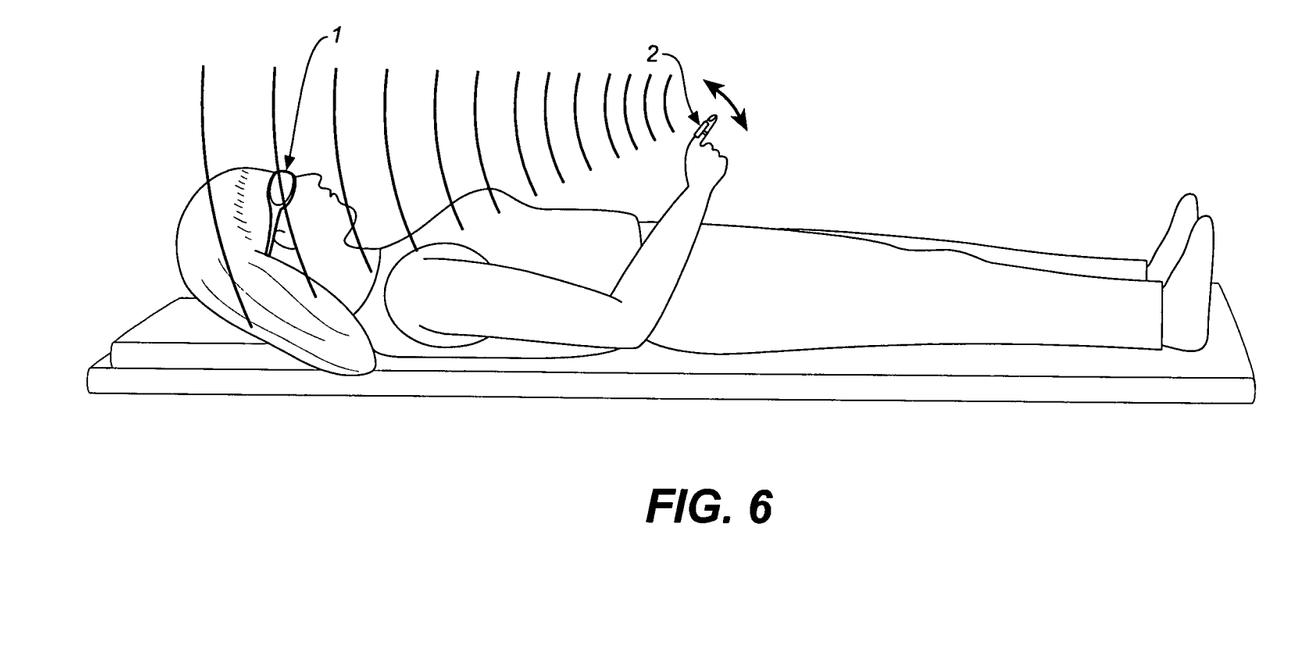
FIG. 6 is an illustration of a user wearing the motion sensor on a finger while moving the finger in a back and forth motion.

Although the portable system described herein is directed to presenting a real time video display to a user while engaging in aerobic exercises beneficial to the user's physical body, the system can also be used therapeutically to create the sensation in the user's mind of traveling through an outdoor scene. As illustrated in FIG. 6, person's who are, for example, paralyzed from the waist down or otherwise bedridden, can use the system to create the sensation of walking or running by wearing the video glasses 1 and attaching the motion sensor 2 to a wrist or finger. In this embodiment, so long as the wrist or finger is moved or flexed in a manner that creates some angular motion, the portable system will create a real time video display in the same manner described above for a user exercising on an exercise machine. It is anticipated that the activity of moving a wrist or finger that, in turn, creates the video image of traveling through an outdoor scene may create a neural response in the brain that stimulates neural pathways in the person's legs that are used for walking or running. Over time this neurological activity, along with other therapeutic methods, may allow the paralyzed person to regain some motor activity in their legs or to even walk again.

Although the portable motion sensor and video glasses system has been described in its preferred embodiment and in certain other embodiments, it will be recognized by those skilled in the art that other embodiments and features may be provided without departing from the underlying principals of those embodiments. The scope of the invention is defined by the appended claims.

We claim:

1. A portable system for displaying a real time video of a scene to a user wearing video glasses and while engaging in exercise, comprising:
   (a)) a motion sensor for attachment to the body of the user, said sensor comprising:
      a gyroscope for generating a plurality of consecutive signals based upon the motion of the user's body
      a controller for receiving and processing the consecutive signals; and
      a first device for receiving the consecutive signals from the controller;
   (b) the video glasses comprising:
      a post-production video frame sequence having a plurality of production frames with a predetermined number of post-production frames associated with a corresponding production frame, with said post-production video frame sequence stored in a memory within the video glasses;
      a second device for receiving the consecutive signals from the first device;
      a programmed video processor for receiving the consecutive signals from the second device and determining how many of the post-production frames are to be displayed with a corresponding production frame as function of the difference in magnitude between consecutive signals; and
      viewing screens for displaying a modified post production video frame sequence, with the modified post-production video frame sequence consisting of the production frames and the corresponding number of post-production frames that the video processor determined are to be displayed with each production frame, with the display of the video frame sequence changing as a function of the body motion of the user;
      whereby the video glasses can present the scene to the user that appears to be moving in relation to the body motion of the user.

2. The portable system as in claim 1 in which the body of the user is the user's leg.

3. The portable system as in claim 1 in which the body of the user is the user's ankle.

4. The portable system as in claim 1 in which the body of the user is the user's finger.

5. The portable system as in claim 1 in which the body of the user is the user's wrist.

6. The portable system as in claim 1 in which the consecutive signals produced by the motion sensor are consecutive voltage values.

7. The portable system as in claim 1 in which the post-production frames that are associated with a corresponding production frame are identical to the production frame.

8. A portable system for displaying a real time video of a scene to a user wearing video glasses and while engaging in exercise, comprising:
   (a) a motion sensor for attachment to the body of the user, said sensor comprising:
      a gyroscope for generating a plurality of consecutive signals based upon the motion of the user's body;
      a controller for receiving and processing the consecutive signals; and
      a first device for receiving the consecutive signals from the controller;
   (b) the video glasses comprising:
      a video frame sequence stored in a memory within the video glasses;
      a second device for receiving the consecutive signals from the first device; a programmed video processor for receiving the consecutive signals from the second device and modifying the video frame sequence as a function of the difference in magnitude between the consecutive signals, and
      viewing screens for displaying the modified video frame sequence with the display of the modified video frame sequence changing as a function of the body motion of the user;
      whereby the video glasses can present the scene to the user that appears to be moving in relation to the body motion of the user.

9. A method for displaying a real time video of a scene to a user wearing video glasses and while engaging in exercise, comprising the following steps:
   producing a video frame sequence;
   storing the video frame sequence in a memory within the video glasses;
   attaching a motion sensor to the body of the user;
   using the motion sensor to generate a plurality of consecutive signals in response to the motion of the user's body;

sending the signals to a programmed video processor within the video glasses;
using the video processor to modify the video frame sequence as a function of the difference in magnitude between consecutive signals; and
displaying the modified video frame sequence with the display of the video frame sequence changing as a function of the body motion of the user;
whereby the video glasses can present the scene to the user that appears to be moving in relation to the body motion of the user.

10. A method for displaying a real time video of a scene to a user wearing video glasses and while engaging in exercise, comprising the following steps:
producing a production video frame sequence having a plurality of production frames;
producing a post-production video frame sequence having a predetermined number of the production frames with a predetermined number of post-production frames associated with a corresponding production frame;
storing the post-production video frame sequence in a memory within the video glasses;
attaching a motion sensor to the body of the user;
using the motion sensor to generate a plurality of consecutive signals in response to the motion of the user's body;
sending the consecutive signals to a programmed video processor within the video glasses;
using the video processor to determine how many of the post-production frames are to be displayed with a corresponding production frame as function of the difference in magnitude between the consecutive signals; and
displaying a post-production video frame sequence, with the post-production video frame sequence consisting of the production frames and the corresponding number of post production frames that the video processor determined are to be displayed with each production frame, with the display of the post-production video frame sequence changing as a function of the body motion of the user;
whereby the video glasses can present the scene to the user that appears to be moving in relation to the body motion of the user.

* * * * *